United States Patent
Kumar et al.

(10) Patent No.: US 8,509,756 B2
(45) Date of Patent: Aug. 13, 2013

(54) SYSTEM AND METHOD FOR REPORTING LOSS OF BROADBAND CONNECTIVITY

(75) Inventors: Shiv Kumar, Marlboro, NJ (US); Paritosh Bajpay, Edison, NJ (US); Jackson Liu, Middletown, NJ (US); Narendra Ravi, Howell, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 380 days.

(21) Appl. No.: 12/868,206

(22) Filed: Aug. 25, 2010

(65) Prior Publication Data
US 2012/0052857 A1 Mar. 1, 2012

(51) Int. Cl.
*H04M 3/00* (2006.01)
(52) U.S. Cl.
USPC ........ 455/418; 455/423; 455/424; 455/435.1; 455/466; 370/328; 370/331
(58) Field of Classification Search
USPC ...... 455/418, 423, 424, 435.1, 466; 370/328, 370/331
See application file for complete search history.

(56) References Cited

U.S. PATENT DOCUMENTS

| | | | |
|---|---|---|---|
| 2005/0030174 A1* | 2/2005 | Hess | 340/531 |
| 2005/0096051 A1* | 5/2005 | Lee et al. | 455/438 |
| 2009/0231122 A1* | 9/2009 | Yeung et al. | 340/524 |
| 2010/0113027 A1* | 5/2010 | Hsu | 455/436 |

FOREIGN PATENT DOCUMENTS

| | | | |
|---|---|---|---|
| WO | WO 98/10392 | * | 3/1998 |
| WO | WO 2004/111967 A1 | * | 12/2004 |

* cited by examiner

*Primary Examiner* — Nimesh Patel
(74) *Attorney, Agent, or Firm* — Turocy & Watson, LLP

(57) ABSTRACT

The subject disclosure provides a system and methods for a central network monitoring authority to be automatically alerted upon loss of broadband connectivity at a residential gateway. In connection with detecting a connectivity loss in a residential gateway, traceable alert data is created, a mobile device is located within range of an associated femto cell, the traceable alert data is provided to the mobile device; and the mobile device is then employed to transmit the traceable alert data to a central network monitoring authority.

37 Claims, 10 Drawing Sheets

SYSTEM AND METHOD FOR REPORTING LOSS OF BROADBAND CONNECTIVITY

TECHNICAL FIELD

The subject disclosure relates generally to wireless communications, and more specifically, to automatically alerting a central network monitoring authority upon loss of broadband connectivity.

BACKGROUND

The use of wireless communication devices have become so prevalent in today's society that almost everyone uses a cell phone or other wireless communication device for communication with one another. As people become more confident with the use of these wireless communication devices and the services they provide, the use of wired devices, such as a wired telephone at home, have become less important in day-to-day life. The result of this change in behavior has led many people to discontinue their wired communication service and rely entirely on their wireless communication device. In some circumstances, such as those living on the fringe of service or living in large multi-unit complexes, the marginal signal strength in these locations makes relying entirely on a wireless service a somewhat risky proposition.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femto cells. The coverage area of a femto cell is relatively small and may cells may be connected to use mobile broadband access such as via High-Speed Downlink Packet Access (HSDPA).

Femto cells have evolved to allow the user to increase or provide sufficient signal strength in be overlapped with neighboring wireless systems and other femto cells. Femto cells are also connected to the wireless communication system using an Internet Protocol based transmission system. Typically, such miniature base stations are connected to the Internet and the mobile operator's network via broadband fixed access such as via a residential gateway (typically a Digital Subscriber Line (DSL) router or a cable modem). Alternatively, the femto cells can be implemented in any area where the user desires wireless communication device usage and a high-speed internet connection is available. For example, a wireless communication device user can install and initialize a femto cell in their apartment and create a wireless communication service bubble permitting reliable communications by the wireless device and allowing the user to cancel their wired communications service and rely on their wireless communication device.

Neighboring wireless communication systems may employ one or more radio access technologies on one or more frequencies typically via fixed base stations, also known as macro cells. Furthermore, a system may have one radio access technology overlaying another. For example, portions of a global system for mobile communications (GSM) system may be overlapped with Wideband Code Division Multiple Access (WCDMA) base stations which may be overlapped with various femto cells. It may be desirable for the user equipment (UE) communicating on the macro cell to handoff to the femto cell system either when idle or while in call without dropping an active call.

Generally, a femto cell is a low-powered base station that typically resides within a building and provides cellular transceivers with access to a fixed network. The femto cell generally includes base station functionality, as well as means to communicate with a fixed network such as the Internet. Generally, a femto cell utilizes a residential gateway and related components to access the internet. As used herein, the term "residential gateway" refers to an interface between a wide area network (WAN) and one or more local end user devices, also referred to as customer premises equipment (CPE) devices. Residential gateways operate as functional bridges between the external network and the CPE devices, receiving application-agnostic data from the external network, separating the data into various types, optionally reformatting it for a particular application, and distributing the data via one or more in-premises networks to one or more CPE devices. Each CPE device may consume the data in its raw format or perform additional transformations on the data prior to use. Data that is distributed by the gateway may include, but is not limited to, voice, video, and/or computer data.

Conventional residential gateway devices provide end users with only limited data monitoring and control functions. For example, conventional residential gateways permit some filtering of computer data for security and network management purposes, such as providing firewall and Dynamic Host Configuration Protocol (DHCP) services. These functions of the residential gateway are generally configured by the end user via a Web interface, which provides some visibility into the traditional computer data functions of the gateway device, as well as Simple Network Management Protocol (SNMP) network monitoring and control functions. It should be noted that currently most residential gateways do not generate SNMP traps. In general, however, apart from the provisioning and control of computer data network services, no other function exists within these devices to control or monitor other application data types, such as voice or video.

Some conventional residential gateways include interfaces that convert voice and video data received from the WAN from an Internet Protocol (IP) format into a native format used by a customer premises equipment (CPE) device, such as a telephone or television. Control of these interfaces may be provided via provisioning services from the network or from craft interfaces into the residential gateway, but in general this control is limited to "on/off" type functionality, such as mapping IP addresses to telephone numbers, or providing a video cutoff relay.

Central network monitoring authorities (usually service providers) have methodologies to monitor, control, and maintain the connectivity of groups of customers (e.g., in a small metropolitan area). Various methods are known for monitoring and/or controlling connectivity within neighborhoods and fixed access points. However, today, the connectivity in individual residential gateways is unmonitored.

The above-described deficiencies of today's wireless communications systems are merely intended to provide an overview of some of the problems of conventional systems, and are not intended to be exhaustive. Other problems with the state of the art and corresponding benefits of one or more of the various non-limiting embodiments may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description presented later.

The disclosure describes a system and methods for automatically alerting a central network monitoring authority upon loss of broadband connectivity. The system and methods disclose detecting a connectivity loss in a residential gateway; creating traceable alert data; locating a mobile device within range of an associated femto cell; providing the traceable alert data to the mobile device; and employing the mobile device to transmit the traceable alert data to a central network monitoring authority.

In another aspect, the method includes employing a processor to execute a set of code instructions stored in a computer-readable storage medium, the set of code instructions, when executed by the at least one processor, performs a group of acts comprising: receiving a traceable alert data, the alert data indicating a connectivity loss in an associated residential gateway; locating a mobile device within range; and providing the traceable alert data to the mobile device.

In another aspect, the system for alerting a central network authority of the loss of connectivity includes: a network interface; a sensor for detecting a loss of connectivity at the network interface; and an intelligent component for creating alert data indicative of the loss of connectivity.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein.

DETAILED DESCRIPTION

Figure 1:
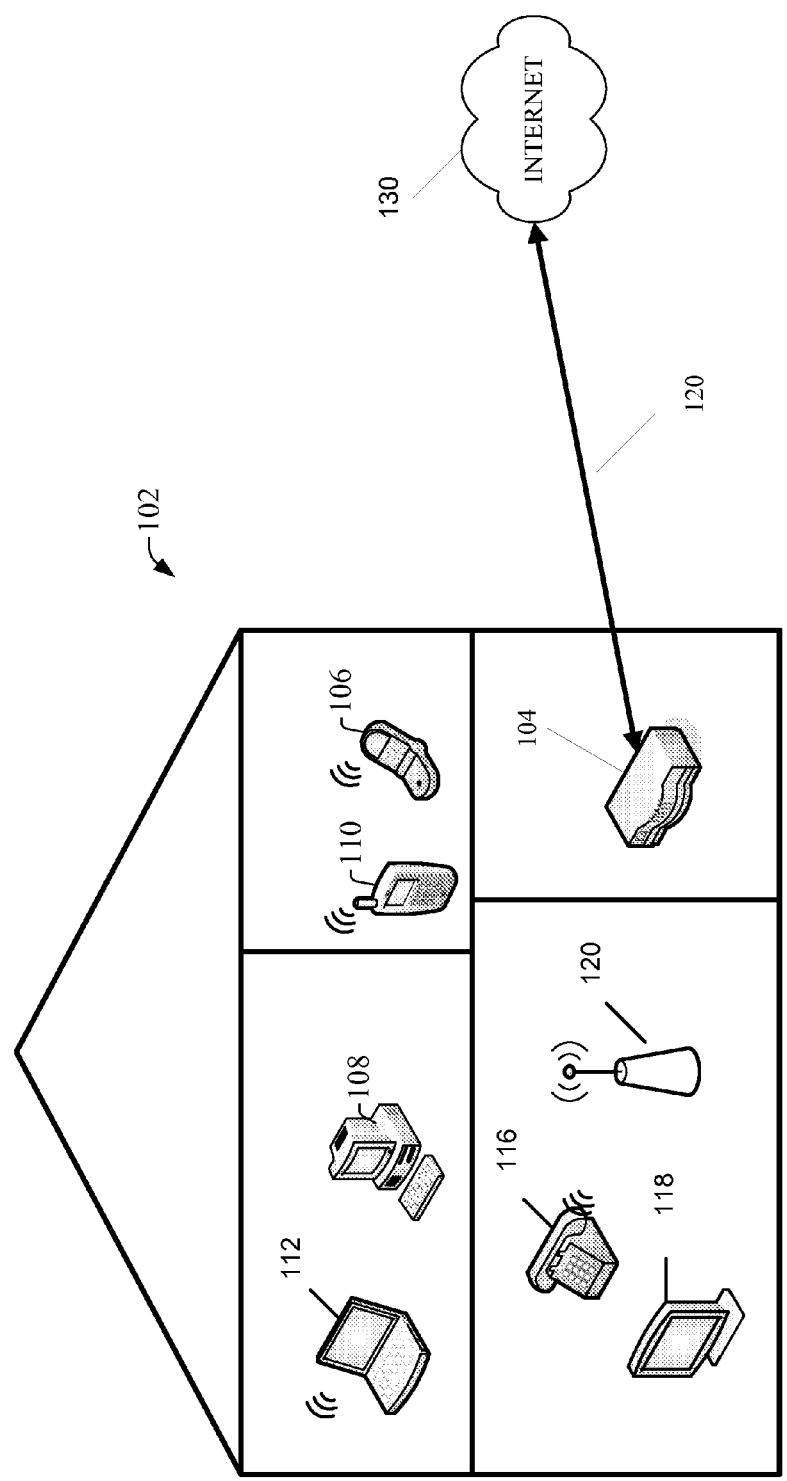
FIG. 1 is a simplified schematic illustrating an operating environment according to exemplary embodiments.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "station," "framework," "connector," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the words "exemplary" and "example" are used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "end device," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, terms "core network", "core mobility network", "service provider network" and the like are employed interchangeably throughout the subject specification, unless context warrants particular distinction (s) among the terms.

Referring to the drawings, FIG. 1 illustrates an example system for automatically alerting a central network monitoring authority, with associated components is illustrated in accordance with aspects described herein. In example system 102, a set of one or more device(s) 106, 110 can report or provide a network alarm incident, or "network problem," to a central network monitoring authority operated by a service provider. The at least one network performance incident is specific to the service provide by the network. In a telecommunication network, the at least one network performance incident can be at least one of a dropped call, no coverage, voice quality issues, etc. In a wireline network, such as a digital cable service, the at least one network performance incident can include poor image quality, unavailability of programming guide, authentication fail event(s) for pay-per-view programming, or the like. The set of one or more device (s) 106, 110 includes at least one of a mobile device or a wireline device (e.g., customer premise equipment, such as a Digital Video Recorder (DVR), femto cell access point, pico cell access point, Wi-Fi access point, digital television, or the like).

Generally, a residential gateway 104 can connect to a WAN 130 via most any transmission link 120. As an example, the link 120 can be a fiber optic cable, such as but not limited to one or more T-1 lines, a Digital Subscriber Line (DSL), Broadband over Power Lines (BPL), Cable Television Internet Access. The link 120 can utilize most any protocol and can carry both user data (e.g., user plane) and signaling (e.g., control plane) between the residential gateway 104 and WAN 130.

The system 102 includes any number of communications devices, such as depicted local desktop computer 108, laptop computer 112, telephone 116, television and/or set top box (STB) 118. The system also includes a femto cell 120. For purposes of the present disclosure, a "communications device" may be any tethered or untethered communications device, and may include any personal computer (e.g., desktop, laptop, personal digital assistant (PDA) (e.g., palmtop), notebook, server computer, television or handheld computing device) equipped with a suitable fixed wired or wireless modem, a mobile communications device (e.g., cellular phones or data-enabled handheld devices capable of receiving and sending messages, web browsing etc.), or any enhanced communications device (e.g., PDA) or integrated information appliance capable of email, text services (such as SMS/MMS), video mail, Internet access, corporate data access, messaging, calendaring and scheduling, information management, and the like through the Internet, intranets or extranets via e.g. any IEEE 802.11 standard, IEEE 802.15 standard, IEEE 802.16 standard, or Wireless Wide-Area Networks (WWANs). In some embodiments, one or more communications devices may be capable of operating in multiple modes (e.g., Dual Transfer Mode (DTM) or Multi-Radio Access Bearer (RAB) terminals) in that these devices may engage in both circuit-switched (CS) as well as packet-switched (PS) communications, and can transition from one mode of communications to another mode of communications without loss of continuity. Typically, various user equipment can utilize most any attachment procedure to connect with base station 102, when the UE 104 is within the coverage area of the base station 120. Typically, the UE 104 as disclosed herein can include most any wireless communication device employed by a subscriber, such as, but not limited to, a cellular phone, a personal digital assistant (PDA), a laptop, a personal computer, a media player, a gaming console, and the like. Further, it can be appreciated the UE 104 can be mobile, stationary, and/or have limited mobility. In one aspect, UE 104 can request for content from the core network 106.

A mobile device can be user equipment or any device enabled for wireless communication, such as a cellular phone; a portable computer (e.g., netbooks or laptops); personal digital assistants (PDAs); a Moving Picture Experts Group (MPEG)-1 Audio Layer 3 (MP3) player; a portable radio tuner (satellite-signal based or conventional); a portable gaming box; or the like. A wireline device can be one of a wireline telephone, a tethered personal computer, a set top box, a television (TV) set, a stereo music player, a tethered radio tuner, a tethered gaming box (e.g., set top box), a digital video recorder (DVR), or the like.

The residential gateway 106 is typically installed in the premises of a residential or commercial establishment. Generally, a residential gateway may provide the functionality of a modem and router and may be, for example, a cable modem, a router, a switch, a wireless modem, a wireless router, and so on. The residential gateway allows the connection of a Local Area Network (LAN) (used in the home or at a commercial establishment) to a Wide Area Network (WAN), such as the Internet. The WAN can often be the Internet or can merely be a larger LAN of which the home is a part (such as a municipal WAN that provides connectivity to the residences within the municipality). WAN connectivity may be provided through DSL, cable modem, a broadband mobile phone network, or other connections.

Traditional fixed line communication systems, such as digital subscriber lines (DSLs), cable lines, dial-up networks, or like connections offered by service providers are alternative and sometimes competing communication platforms to wireless communications. However, in recent years users have begun replacing fixed line communications with mobile communications. Several advantages of mobile communication systems, such as user mobility, small relative size of user equipment (UE), and ready access to public switched telephone networks as well as the Internet, have made such systems very convenient and thus very popular. As users have begun relying more and more on mobile systems for communication services traditionally obtained through fixed line systems, demand for increased bandwidth, reliable service, high voice quality, and low prices has intensified.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out, or a multiple-in-multiple-out (MIMO) system.

In addition to mobile phone networks currently in place, a new class of small base stations has emerged. These small base stations are low power and can typically utilize fixed line communications to connect with a network operator's core network. In addition, these base stations can be distributed for personal/private use in a home, office, apartment, private recreational facility, and so on, to provide indoor/outdoor wireless coverage to mobile units. These personal base stations are generally known as femto cells, or personal femto access points, or access points, or home node B units (HNBs), or home-evolved eNode B units (HeNBs). Typically, such miniature base stations are connected to the Internet and the operator's network via a DSL router or cable modem. Pico cells also generally approximate a cellular base station, but also benefit from a small size, including dimensions less than or equal to those of a WiFi access point. As a result, pico cells can fit easily and unobtrusively in a building environment. For purposes of the present disclosure, the term "femto cell" will generally include personal femto access points, or access points, or home node B units (HNBs), home-evolved eNode B units (HeNBs), pico cells, or any user terminal with the capability to perform required base station operations, with different air-interface, functionality or configurations and being operated in a coordinated manner. Such femto cell base stations offer a new paradigm in mobile network connectivity, allowing direct subscriber control of mobile network access and access quality.

Development of varying types of wireless access points to communication networks (e.g. public land mobile networks (PLMNs), network operators, mobile operator core networks, etc.) have been one solution offered to effect convergence between traditional wireless communication systems and traditional fixed-line communication systems. The convergence, otherwise known as fixed-wireless convergence, involves a degree of interoperability between fixed line networks (e.g. intranet, Internet, etc.) and mobile communication networks (e.g. cellular phone networks). A femto access point, as described herein, includes any suitable node, router, switch, hub, or the like, configured to communicatively couple an access terminal (AT) with a communication network. The femto access point can be wired (e.g. employing Ethernet, universal serial bus (USB), or other wired connection for communication), wireless (e.g. employing radio signals for communication), or both. Examples of femto access points include access point base stations (BSs), wireless local area network (WLAN) access points, wireless wide area network (WWAN) access points, including worldwide interoperability for microwave access (WiMAX) BSs, and the like.

Femto access points comprise access points to a communication operator's network, such as a mobile communication operator's network, a circuit-switched voice network, a combined circuit-switched and packet-switched voice and data network (or all-packet voice and data network), or the like. Examples of a femto access point include a Node B (NB), base transceiver station (BTS) a home Node B (home NodeB, Home Node B, HNB), a home-evolved eNode B (HeNB), or simply a BS, of various transmit power/cell size including macro cells, micro cells, pico cells, femto cells, etc. Consistent with the aforementioned trends, successive deployments of femto cells can be expected to have more and more IP Multimedia Subsystem (IMS)-based functionality. Thus, a femto access point might include sufficient IMS functionality so as to be described as an IMS client femto access point.

It is noted that while various aspects, features, or advantages of the subject embodiments are illustrated through femto access point(s) and associated femto network platform, such aspects and features also can be exploited in indoor-based base stations (e.g., home-based access point(s), enterprise-based access point(s)) that provide wireless coverage through substantially any, or any, disparate telecommunication technologies such as for example Wi-Fi (wireless fidelity) or picocell telecommunication.

In one aspect, the subject innovation utilizes femto cells located in residential or commercial establishments to alert the network Operational Support System in case of broadband connectivity loss. In the proposed solution, the femto cell will receive alerts from the residential gateway and will use an in-range user equipment (UE) to initiate data alerts to network OSSs. User equipment will utilize text services such as the Short Message Service (SMS) and/or Multimedia Message Service (MMS) capability to send alerts to Network OSS without any billing impact on the customer. It is noted that sending the alert data via user equipment will require administrative changes to prevent customers from being billed for utilizing text services such as SMS/MMS services.

In an aspect of the subject innovation, feedback 150 can be delivered to a device in a form of network news in response to delivery of report 110 via, at least in part, incident report component 108. Accordingly, every submission of report 110 can have a "feedback response" from the network operator; in one aspect, such potential response includes delivery of a message (e.g., a SMS message) that acknowledges reception of report 110. Feedback system 140 can provide feedback in accordance with the following aspects. If the "problem noted in a certain area" is associated with a cellsite with a problem, the "news" that shows up as an alert in the app says "technical difficulties have been noted in the area, and expected solution has ETA XXX". If the problem reported in the area is related to capacity, and we have "capacity augmentation plans" in our database, then we provide network news as to when the capacity adds will be in place. If the problem reported in an area is related to coverage, and we have coverage improvement plans, then we provide feedback related to the coverage improvement plans. If the problem reported is related to performance that is not coverage or capacity, and we have performance improvement plans in place, we have the ability to share those plans and ETA via network news. If the problem has no known plans, then we have the ability to create a ticket, and can inform the customer that a ticket has been created.

In another aspect of the subject innovation, feedback 150 can be supplied to a device within the set of device(s) 106 as part of an alerting service, to which the device can subscribe. The alerting service can provide network development information related to specific area(s); such information can include planned deployments of base stations, addition Subscription to the alerting service can be allowed at a time the device delivers an initial network performance incident report or at a time the device deploys, e.g., installs, builds, and activates, the incident report component 108. To deliver information or content as part of the alerting service, server(s) 156 can include at least one application server that can extract network alerts or news from a memory or memory element (e.g., a database) in response to a query from a device that subscribes to the alerting service. The query can be received and processed by the application server or a database manager component (not shown). A server or node that is part of operational layer(s) 160, e.g., network and marketing layer, can provide content to the memory or the memory element.

Currently, if a residential gateway loses network connectivity and there is no higher level domain network failure alarm, the network OSS cannot proactively determine individual residential gateway loss of service. Typically, a user has to call the network OSS to report connectivity loss. The embodiments described herein proactively alert network OSS when a residential gateway loses connectivity even when there is no network alarm.

In one aspect, the residential gateway has firmware for detecting network connectivity loss and makes real-time rules based decision to alert the network OSS. In an optional embodiment, the network OSS will wait for a pre-defined period before alerting the network OSS. The rule based processor then will create and send alert data to the femto cell. The femto cell then will locate an in-range cell phone and send an SMS/MMS alert to the network OSS. Then the Network OSS can then create and take follow up corrective action.

The proactive management of the residential gateway will result in real-time detection of connectivity loss between a residential gateway and the network. The network can include the alarm reporting function in a manner that will require approval from the cell phone owner.

In an aspect, a periodic monitoring of the residential gateway may be performed by a heartbeat monitor. The heartbeat monitor may be configured to periodically monitor the residential gateway for communication. Should communication with the monitored gateway be lost, an automatic notification may be provided to the residential gateway. In one aspect, the notification may include time stamp data so that the exact time of the loss of connectivity may be noted and archived for logging or analysis.

In another aspect, the periodic monitoring may include monitoring of various performance parameter measurements of the broadband connection. Such performance parameter measurements may include detection and measurement of throughput, latency, bandwidth, and other performance and security parameters. The monitoring function collects, stores, and analyzes performance data, line conditions and stability data and may provide the performance measurement data as part of the automatic notification. In one aspect, the performance measurement data is only collected when the relevant measurement reaches certain predetermined thresholds. In another aspect, the notification may include time stamp data so that the exact time for the relevant measurement may be noted and archived for logging or analysis.

In another aspect, the performance measurement data includes the detection and measurement that reflect the following conditions of the broadband connection: (1) the complete loss of signal/connectivity with the network; (2) very little connectivity with the network (i.e., dying gasp message); and (3) intermittent connectivity with the network. It will be understood that the listed conditions are not intended to be exhaustive or limiting. Other conditions of the broadband connection which require alerting of the central network authority may become further apparent.

Figure 2:
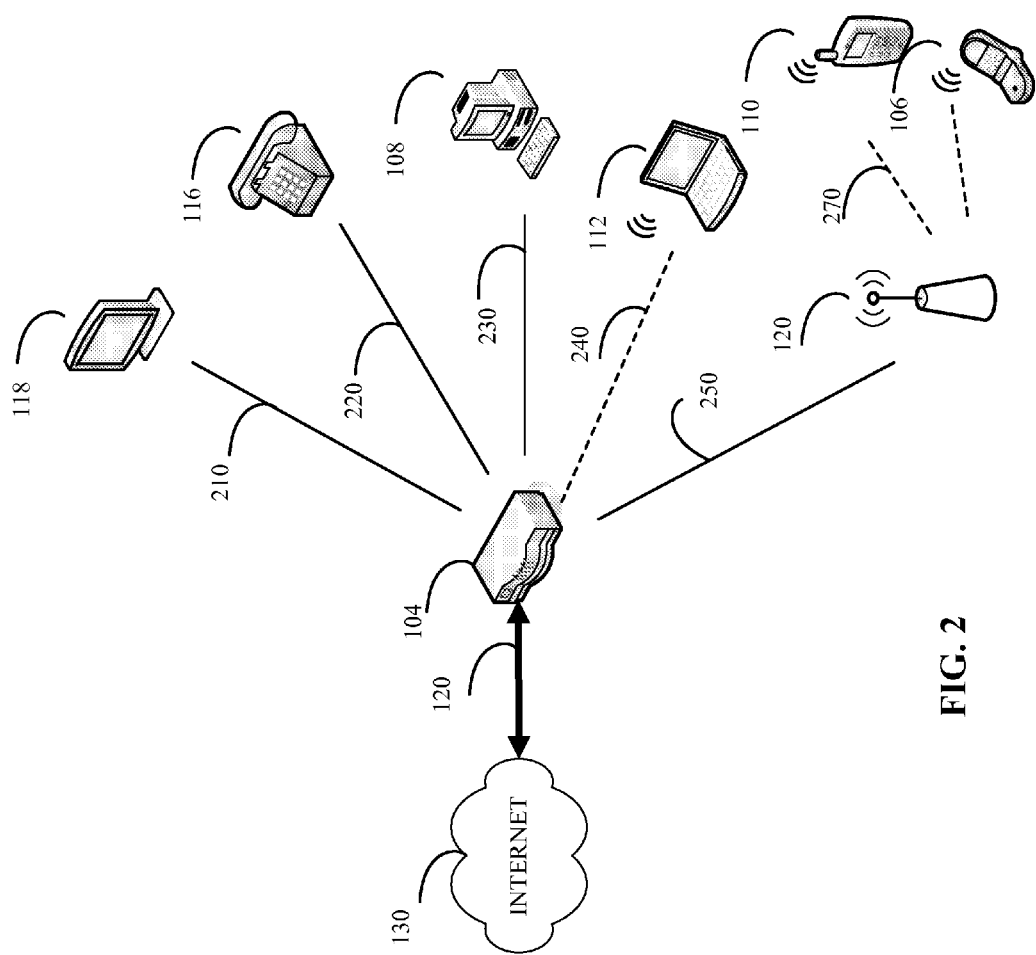
FIG. 2 is a simplified schematic illustrating an operating environment according to exemplary embodiments.

In FIG. 2, there is shown a schematic diagram of a residential gateway 104 which has a network interface (not shown) and a network access switch (not shown). The residential gateway provides an interface for communicating with the illustrated various communication devices to facilitate exchange of data through various communication links (e.g., a coaxial cable 210, a Category 3 (Cat 3) or unshielded twisted pair (UTP) 220, an Ethernet connection or Category 5 cable 230, a Wi-Fi connection 250, etc.).

The femto cell 120 typically serves a few (for example, 1-5) wireless devices within confined coverage area via a wireless link 270 to mobile devices 106, 110 in the coverage area which encompasses a downlink and an uplink. A femto network platform (not shown) can control such service, in addition to mobility handover from macro-to-femto handover and vice versa, and registration and provisioning of femto access points (AP). Control, or management, is facilitated by backhaul link(s) that connect deployed femto AP with the femto network platform. In an aspect of the subject innovation, part of the control effected by femto AP measurements of radio link conditions and other performance metrics. Femto network platform also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as 106, 110 is substantially straightforward and seamless when handover from femto-to-macro, or vice versa, takes place.

In yet another aspect, the femto cell 120 has a LAC (location area code) and RAC (routing area code) that is different from the underlying macro network. These LAC and RAC are used to identify subscriber station location for a variety of reasons, most notably to direct incoming voice and data traffic to appropriate paging transmitters, and emergency calls as well. As a subscriber mobile device (e.g., 110, 106) that exploits macro coverage enters femto coverage, the subscriber mobile device attempts to attach to the femto cell 120 through transmission and reception of attachment signaling. The attachment signaling can include a Location Area Update (LAU) and/or Routing Area Update (RAU). Attachment attempts are a part of procedures to ensure mobility, so voice calls and data sessions can continue even after a macro-to-femto transition or vice versa. Conversely, if not successful, the mobile device is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, the mobile device is allowed on femto cell 120, and incoming voice and data traffic are paged and routed to the subscriber through the femto cell. To facilitate voice and data routing, and control signaling as well, successful attachment can be recorded in a memory register, e.g., a Visitor Location Register (VLR), or substantially any data structure stored in a network memory.

Figure 3:
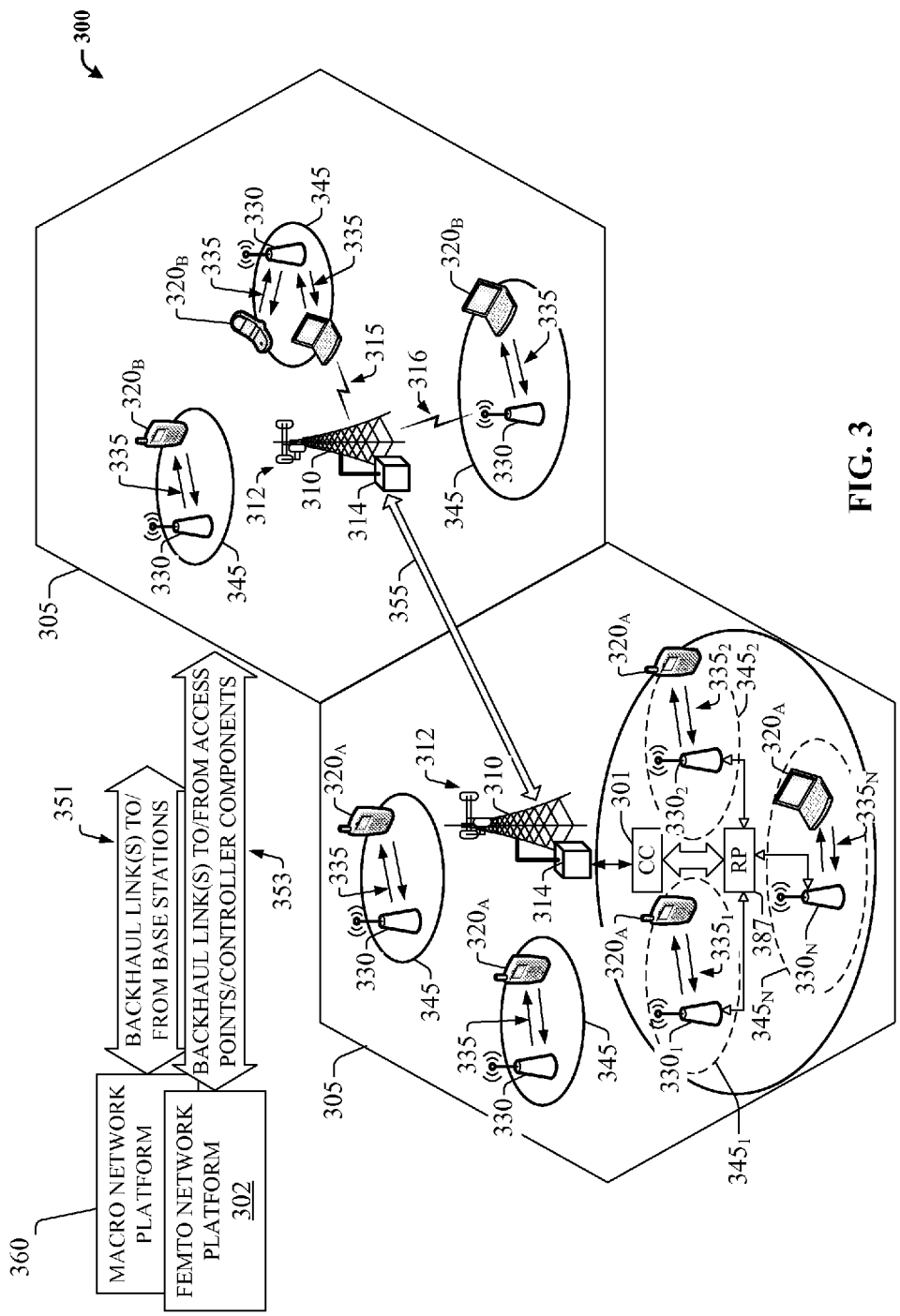
FIG. 3 is a simplified schematic illustrating an operating environment according to exemplary embodiments.

FIG. 3 illustrates a wireless environment that includes macro cells and femto cells for wireless coverage in accordance with aspects described herein. In wireless environment 350, two areas 305 represent "macro" cell coverage; each macro cell is served by a base station 310. It can be appreciated that macro cell coverage area 305 and base station 310 can include functionality, as more fully described herein, for example, with regard to system 300. Macro coverage is generally intended to serve mobile wireless devices, like UE $320_A$, $320_B$, in outdoors locations. An over-the-air wireless link 315 provides such coverage, the wireless link 315 comprises a downlink (DL) and an uplink (UL), and utilizes a predetermined band, licensed or unlicensed, of the radio frequency (RF) spectrum. As an example, UE $320_A$, $320_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 310 communicates via backhaul link(s) 351 with a macro network platform 360, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 360 controls a set of base stations 310 that serve either respective cells or a number of sectors within such cells. Base station 310 comprises radio equipment 314 for operation in one or more radio technologies, and a set of antennas 312 (e.g., smart antennas, microwave antennas, satellite dish(es) . . . ) that can serve one or more sectors within a macro cell 305. It is noted that a set of radio network control node(s), which can be a part of macro network platform; a set of base stations (e.g., Node B 310) that serve a set of macro cells 305; electronics, circuitry or components associated with the base stations in the set of base stations; a set of respective OTA wireless links (e.g., links 315 or 316) operated in accordance to a radio technology through the base stations; and backhaul link(s) 355 and 351 form a macro radio access network (RAN). Macro network platform 360 also communicates with other base stations (not shown) that serve other cells (not shown). Backhaul link(s) 351 or 353 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 355 link disparate base stations 310. According to an aspect, backhaul link 353 can connect multiple femto access points 330 and/or controller components (CC) 1101 to the femto network platform 302. In one example, multiple femto APs can be connected to a routing platform (RP) 387, which in turn can be connect to a controller component (CC) 301. Typically, the information from UEs $320_A$ can be routed by the RP 102, for example, internally, to another UE $320_A$ connected to a disparate femto AP connected to the RP 387, or, externally, to the femto network platform 302 via the CC 301, as discussed in detail supra.

In wireless environment 350, within one or more macro cell(s) 305, a set of femto cells 345 served by respective femto access points (APs) 330 can be deployed. It can be appreciated that, aspects of the subject innovation are geared to femto cell deployments with substantive femto AP density, e.g., $10^4$-$10^7$ femto APs 330 per base station 310. According to an aspect, a set of femto access points $330_1$-$330_N$, with N a natural number, can be functionally connected to a routing platform 387, which can be functionally coupled to a controller component 301. It can be appreciated that, although the figures do not show sets of femto cells 345 served by respective femto access points (APs) 330 intersecting, neighboring femto cells 345 frequently have concurrent coverage areas. Depending on the transmit power, neighboring femto cells frequently have convergent areas of coverage for handoffs and beacon messages. The controller component 301 can be operationally linked to the femto network platform 330 by employing backhaul link(s) 353. Accordingly, UEs UE $320_A$ connected to femto APs $330_1$-$330_N$ can communicate internally within the femto enterprise via the routing platform (RP) 387 and/or can also communicate with the femto network platform 302 via the RP 387, controller component 301 and the backhaul link(s) 353. It can be appreciated that although only one femto enterprise is depicted in FIG. 3, multiple femto enterprise networks can be deployed within a macro cell 305.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 4:
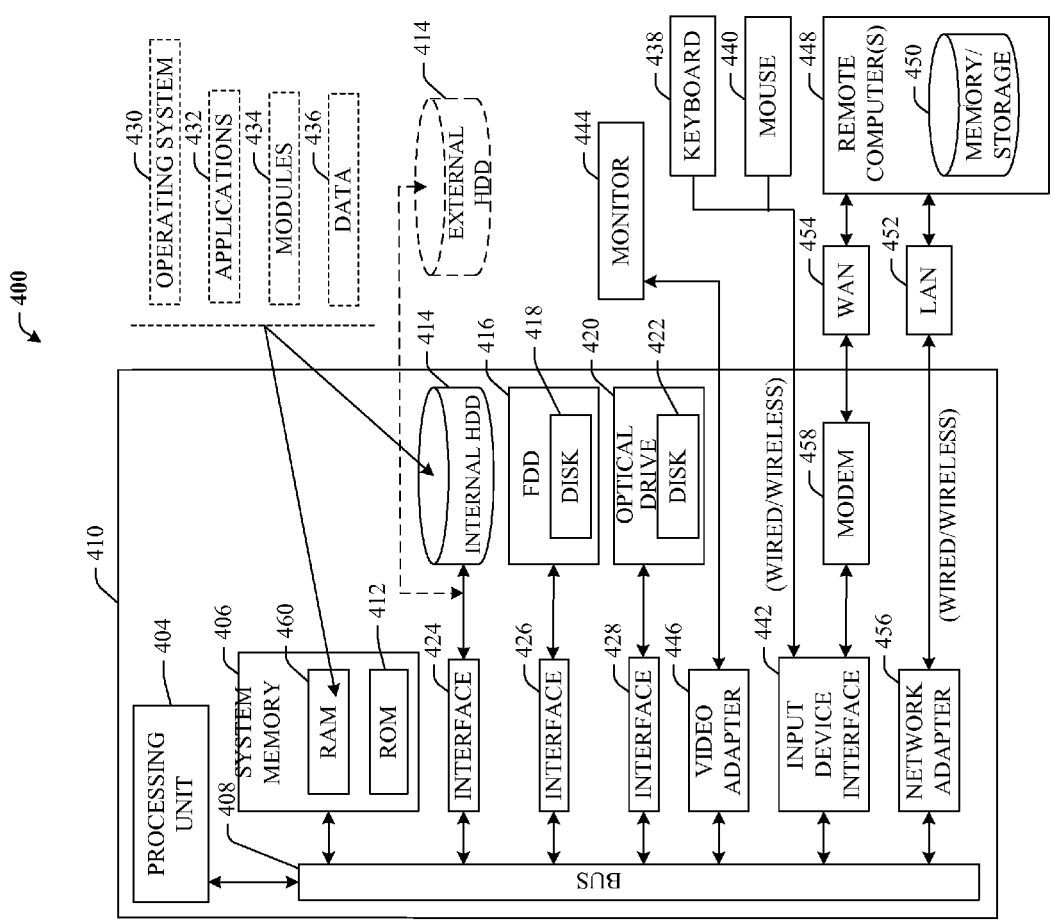
FIG. 4 is a simplified schematic illustrating an operating environment according to exemplary embodiments.

Referring now to FIG. 4, there is illustrated a block diagram of an exemplary computer system operable to execute the disclosed architecture. In order to provide additional context for various aspects of the disclosed subject matter, FIG. 4 and the following discussion are intended to provide a brief, general description of a suitable computing environment 400 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 4, the exemplary environment 400 for implementing various aspects of the disclosed subject matter includes a computer 410, the computer 410 including a processing unit 404, a system memory 406 and a system bus 408. The system bus 408 couples to system components including, but not limited to, the system memory 406 to the processing unit 404. The processing unit 404 can be any of various commercially available processors. Dual microprocessors and other multi-processor architectures may also be employed as the processing unit 404.

The system bus 408 can be any of several types of bus structure that may further interconnect to a memory bus (with or without a memory controller), a peripheral bus, and a local bus using any of a variety of commercially available bus architectures. The system memory 406 includes read-only memory (ROM) 460 and random access memory (RAM) 412. A basic input/output system (BIOS) is stored in a nonvolatile memory 410 such as ROM, EPROM, EEPROM, which BIOS contains the basic routines that help to transfer information between elements within the computer 402, such as during start-up. The RAM 412 can also include a high-speed RAM such as static RAM for caching data.

The computer 402 further includes an internal hard disk drive (HDD) 414 (e.g., EIDE, SATA), which internal hard disk drive 414 may also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 1226 and an optical drive interface 428, respectively. The interface 424 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 412, including an operating system 430, one or more application programs 432, other program modules 434 and program data 436. All or portions of the operating system, applications, modules, and/or data can also be cached in the RAM 412. It is appreciated that the disclosed subject matter can be implemented with various commercially available operating systems or combinations of operating systems.

A user can enter commands and information into the computer 402 through one or more wired/wireless input devices, e.g., a keyboard 438 and a pointing device, such as a mouse 440. Other input devices (not shown) may include a microphone, an IR remote control, a joystick, a game pad, a stylus pen, touch screen, or the like. These and other input devices are often connected to the processing unit 404 through an input device interface 442 that is coupled to the system bus 408, but can be connected by other interfaces, such as a parallel port, an IEEE1394 serial port, a game port, a USB port, an IR interface, etc.

A monitor 444 or other type of display device is also connected to the system bus 408 via an interface, such as a video adapter 446. In addition to the monitor 444, a computer typically includes other peripheral output devices (not shown), such as speakers, printers, etc.

The computer 402 may operate in a networked environment using logical connections via wired and/or wireless communications to one or more remote computers, such as a remote computer(s) 448. The remote computer(s) 448 can be a workstation, a server computer, a router, a personal computer, a mobile device, portable computer, microprocessor-based entertainment appliance, a peer device or other common network node, and typically includes many or all of the elements described relative to the computer 402, although, for purposes of brevity, only a memory/storage device 450 is illustrated. The logical connections depicted include wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which may connect to a global communications network, e.g., the Internet.

When used in a LAN networking environment, the computer 402 is connected to the local network 452 through a wired and/or wireless communication network interface or adapter 456. The adapter 456 may facilitate wired or wireless communication to the LAN 452, which may also include a wireless access point disposed thereon for communicating with the wireless adapter 456.

When used in a WAN networking environment, the computer 402 can include a modem 458, or is connected to a communications server on the WAN 454, or has other means for establishing communications over the WAN 454, such as by way of the Internet. The modem 458, which can be internal or external and a wired or wireless device, is connected to the system bus 408 via the serial port interface 442. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

In various embodiments, a system, method and computer program product are provided for real-time control and/or monitoring of data appearing on one or more CPE interfaces of a residential gateway, where the data includes voice, video and/or computer data. An end user can thus automatically monitor the connectivity of a residential gateway in real-time.

Figure 5:
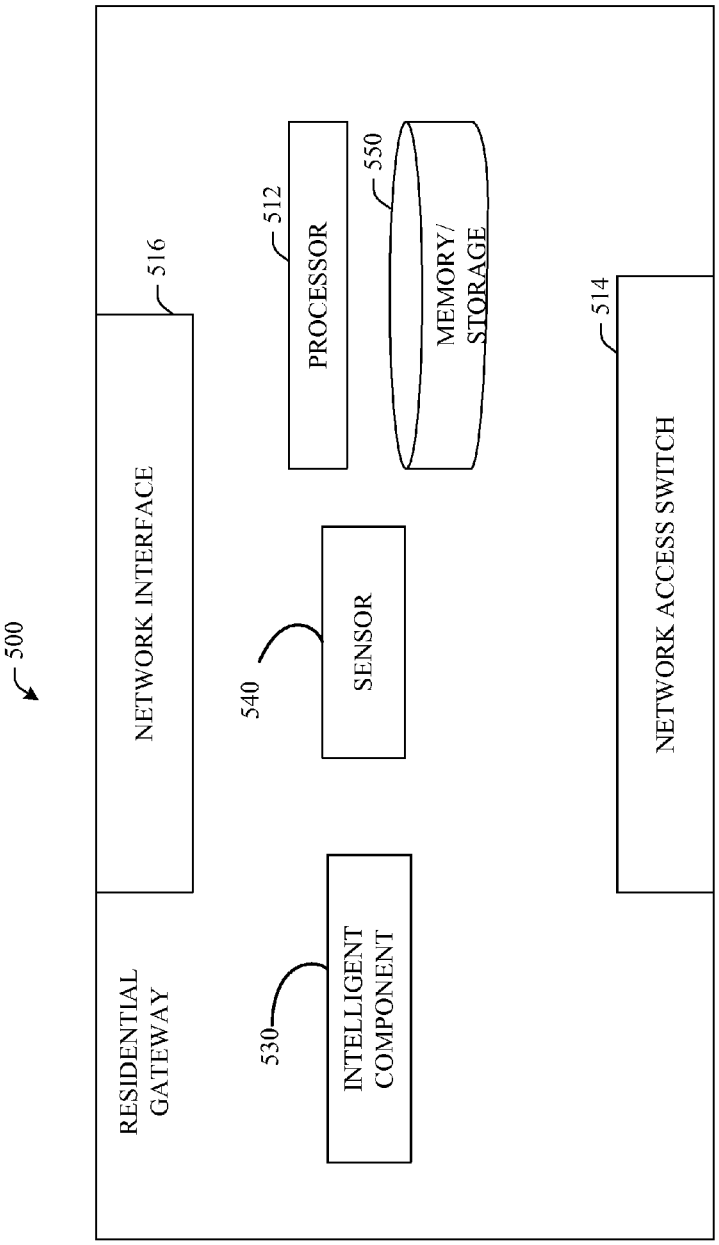
FIG. 5 is a simplified schematic illustrating a residential gateway device according to exemplary embodiments.

Referring to FIG. 5, a schematic diagram of a particular embodiment of a residential gateway is depicted and generally designated 500. The residential gateway 500 includes an intelligent component 530, a sensor 540, a memory 510, a processor 512, a network access switch 514, and a network interface 516. The memory 510, in a particular embodiment, includes non-volatile memory.

The residential gateway provides broadband services including a voice telephony service, a high speed data service, a video service, other broadband service, or any combination thereof. In a particular embodiment, the service provider uses an Internet Protocol Television (IPTV) protocol. In another particular embodiment, the service provider uses a data-over-cable service interface specification (DOCSIS) protocol.

The residential gateway includes an intelligent component 530 which monitors all or substantially all network performance related incidents at a particular residential gateway. In an aspect, the intelligent component 530 executes a rules-based analysis so that network outages or intermittent slowdowns can be monitored. The intelligent component, in an aspect, includes a heartbeat monitor or a specialized sensor 540 for monitoring the broadband connection. In one aspect, the residential gateway may wait a predetermined period of time after initial indications from the monitor or sensor before determining that the loss of connectivity has occurred. It will be noted that there should be consideration for intermittent losses of connectivity when there are periods with lack of packet transmissions and packet receptions. Additionally, there may be perceived a intermittent loss of connectivity when most or all of the connected devices for a residential gateway have been powered off.

Figure 6:
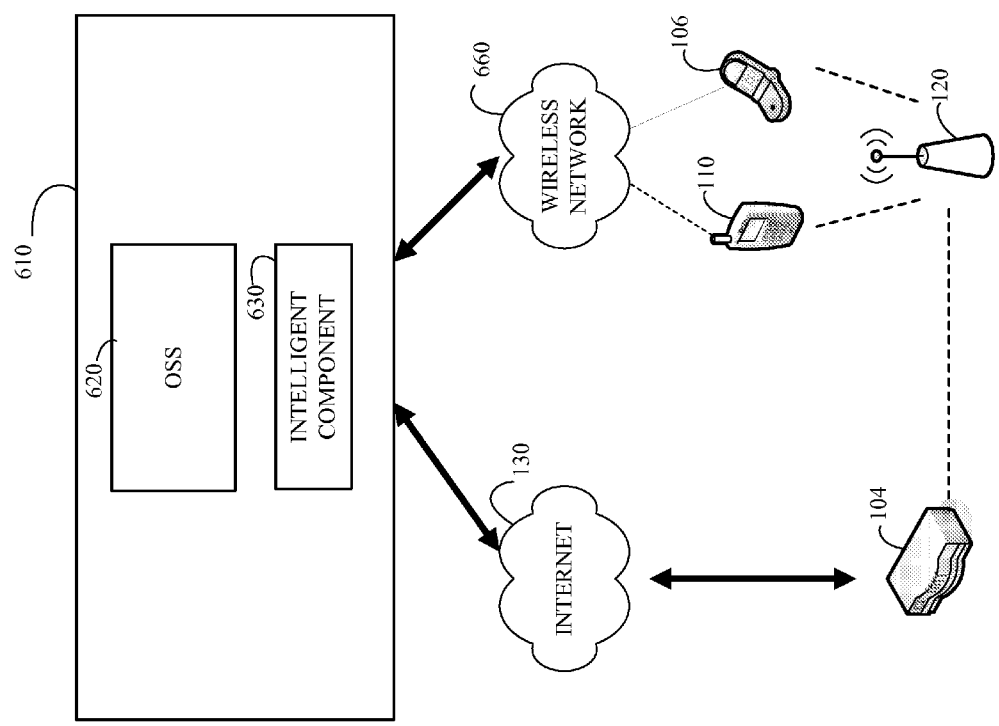
FIG. 6 is a simplified schematic illustrating an operating environment according to exemplary embodiments.

FIG. 6 is a schematic diagram of an example system for reporting the loss of broadband connectivity. The central network monitoring authority 610 (usually a service provider) monitors and administers the network to determine the proper functioning of the network. Service providers not only deal with the networks assets, platforms, and services, but must also support business processes to provide services to their customers and interact with their partners and suppliers, as well as operational processes to monitor and administer these assets. The central network monitoring authority includes an operational support system (OSS) which supports the monitoring of the network with aspects like monitoring, management, and administration; resolution of trouble; billing and/or charging; provisioning; activation; fulfillment; etc. It is imperative that the OSS is notified of any network outages or service failures in a prompt manner. It is desirable to minimize the time, risk, and effort in proceeding from service conception to revenue-generating deployment, and it would be desirable to automate such a process.

The central network monitoring authority also includes an intelligent component 630. In an aspect, the intelligent component 630 can correlate all or substantially all network performance incidents from a plurality of customers in a specific area (e.g., metropolitan market) and can access disparate network systems, (for e.g., operation layers or external layers, to establish if the reported network performance incident is "new" or recurring). Operation layers can include one or more of Network Planning layers, Marketing layers, Business layers, whereas external layers can include vendor layers, contractor layers, regulation layers, or the like. In an aspect, the intelligent component 330 executes a rules-based analysis so that network outages or network slowdowns can be correlated to specific geographical areas or may be categorized as isolated incidents. Based on the correlation assessment (or some other rules-based analysis), the intelligent component 330 can generate network planning or maintenance information to dispatch human repair or maintenance personnel.

Figure 7:
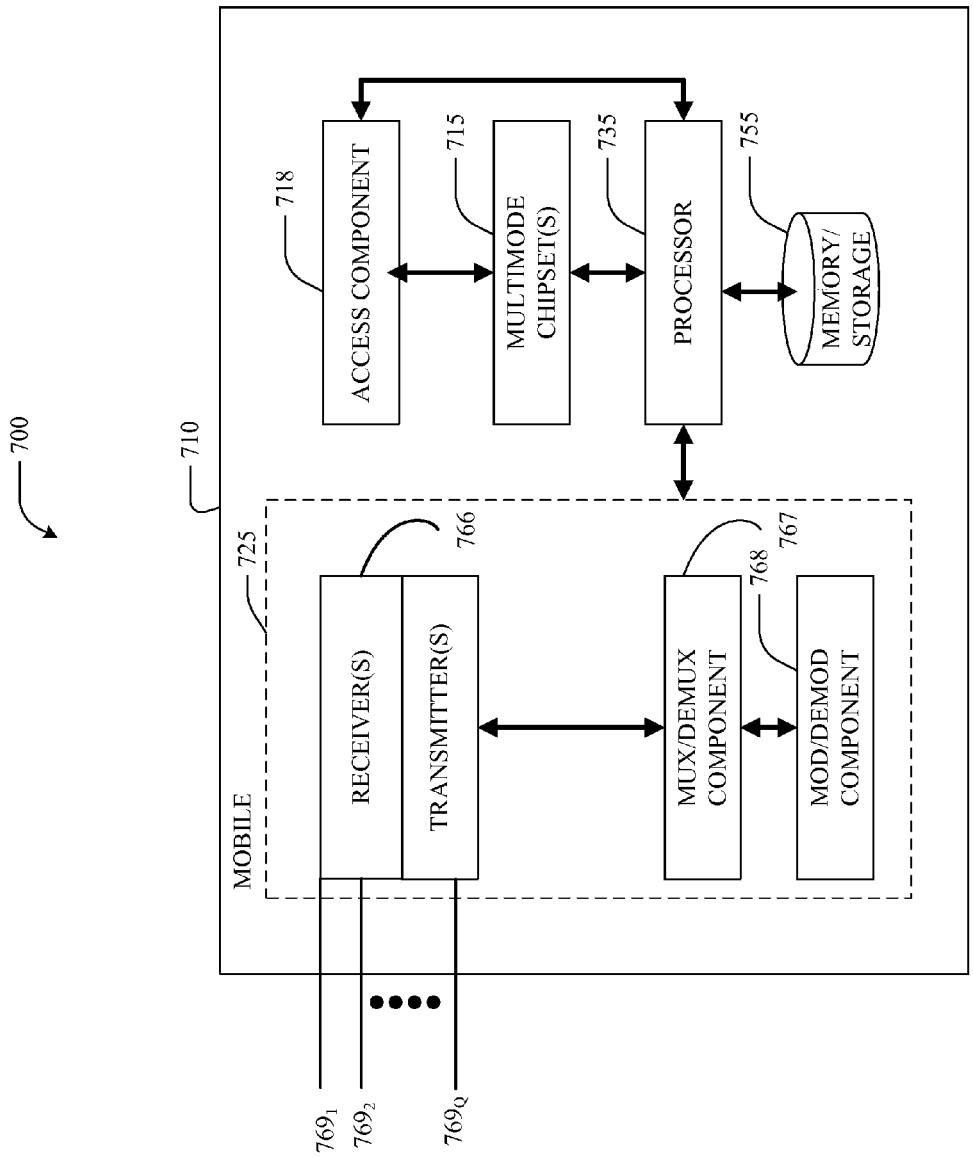
FIG. 7 is a simplified schematic illustrating a mobile device according to exemplary embodiments.

FIG. 7 illustrates a schematic diagram 700 of an example embodiment of a mobile device 710 that can be employed with respect to the alert management system in accordance with aspects described herein. Mobile device 710, which can be a multimode access terminal, includes a set of antennas $769_1$-$769_Q$ (where Q is a positive integer) that can receive and transmit signal(s) to and from wireless devices like access points, femto cell access points, access terminals, wireless ports and routers, and so forth, which operate in a radio access network. It should be appreciated that antennas $769_1$-$769_Q$ are a part of communication platform 725, which comprises electronic components and associated circuitry that provide for processing and manipulation of received signal(s) and signal(s) to be transmitted such as receivers and transmitters 766, mux/demux component 767, and mod/demod component 768.

Multimode operation chipset(s) 715 allows mobile device 710 to operate in multiple communication modes in accordance with disparate technical specification for wireless technologies. In accordance with one aspect, multimode operation chipset(s) 715 utilize communication platform 725 in accordance with a specific mode of operation (e.g., voice, Global Positioning System (GPS)). In another aspect, multimode operation chipset(s) 715 can be scheduled to operate concurrently (e.g., when Q>1) in various modes or within a multitask paradigm.

Mobile device 710 includes access component 718 that can convey content(s) or signaling in accordance with disclosed aspects. It should be appreciated that access component 718, can include a display interface that renders content in accordance with aspects of an interface component (not shown) that resides within access component 718.

Mobile device 710 also includes a processor 735 configured to confer functionality, at least in part, to substantially any electronic component within mobile device 710, in accordance with aspects of the disclosure. As an example, processor 735 can be configured to execute, at least in part, instructions in multimode operation chipset(s) that afford multimode communication through mobile device 710 such as concurrent or multi-task operation of two or more chipset (s). As another example, processor 735 can aid mobile device 710 in receiving and conveying signaling and content(s) (e.g., various data flows) that are part of an active management act initiated by a subscriber that operates mobile 710, or an approval cycle associated with auxiliary subscribers (e.g., secondary subscriber, tertiary subscriber . . . ). Moreover, processor 735 enables mobile device 710 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 755 can store data structures (e.g., metadata); code structure(s) (e.g., modules, objects, classes, procedures . . . ) or instructions; network or device information like policies and specifications, attachment protocols; code sequences for scrambling, spreading and pilot (e.g., reference signal(s)) transmission; frequency offsets, cell IDs, and so on.

The processor 735 is functionally and/or communicatively coupled (e.g., through a memory bus) to memory 755 in order to store and retrieve information necessary to operate and/or confer functionality, at least in part, to communication platform 725, multimode operation chipset(s) 715, access component 718, and substantially any other operational aspects of multimode mobile 710.

Many newer mobile devices (such as smart phones) have an in-built software agents that are able to communicate with a back-office system (like an mFormation based system) to receive commands to execute and send phone data to the back-office system. Essentially these agents enable the implementation of the Fault, Configuration, Accounting, Performance, Security ("FCAPS") model of the ISO Telecommunications Management Network. The newer smart phone in-built software agents can be leveraged to alert service providers regarding issues at home. In one example, sensors at home can alert the intelligent component of a residential gateway of any issues (e.g., flooding in basement or electrical short circuit). In these cases, the intelligent component will formulate an alert with brief text describing the issue and send a message to the femto cell which will utilize in-built mobile software agent in mobile devices to then alert service providers and home owner. Therefore, a similar approach can also be used to alert security service providers of a security alarm when there is no broadband connectivity between the residential gateway and the central network monitoring authority.

Figure 8:
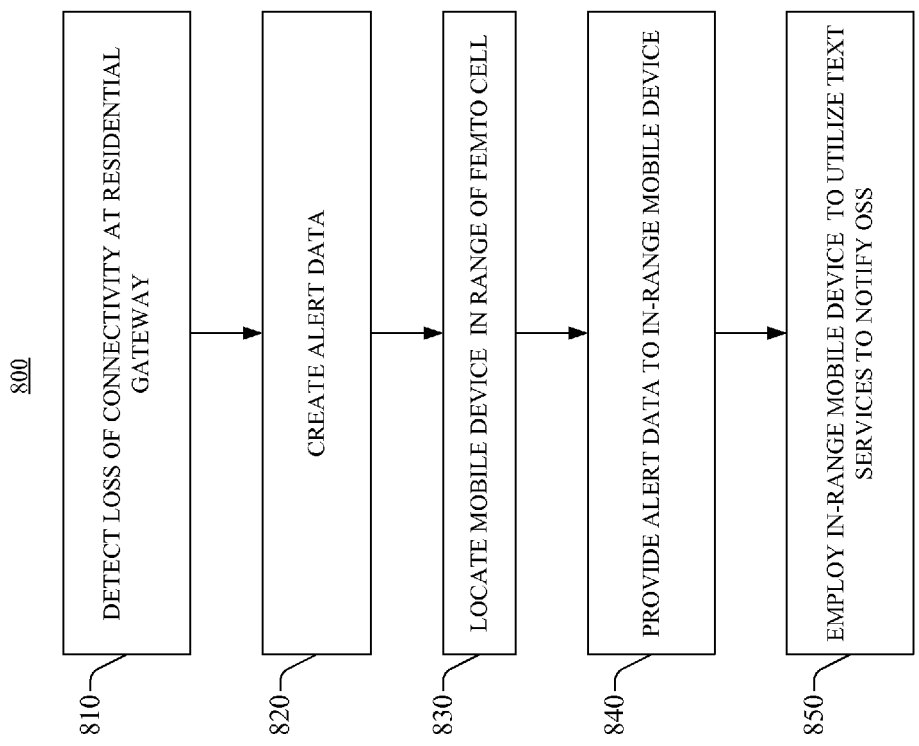
FIG. 8 is a flowchart illustrating the example steps according to exemplary embodiments.

FIG. 8 is a flowchart of an example method 800 for alerting a central network monitoring authority upon loss of broadband connectivity. At 810, the residential gateway detects loss of connectivity at the residential gateway. A periodic monitoring of the residential gateway may be performed by a heartbeat monitor or a specialized sensor for monitoring a broadband connection. In one aspect, the residential gateway may wait a predetermined period of time after initial indications from the monitor or sensor before determining that the loss of connectivity has occurred. It will be noted that there should be consideration for intermittent losses of connectivity when there are periods with lack of packet transmissions and packet receptions. Additionally, there may be perceived a intermittent loss of connectivity when all of the connected devices for a residential gateway have been powered off.

In an aspect, the periodic monitoring may include monitoring of various performance measurements of the broadband connection. Such performance measurements may include detection and measurement of throughput, latency, bandwidth, and other performance and security parameters. The monitoring function collects, stores, and analyzes performance data, line conditions and stability data and may provide the performance measurement data as part of the automatic notification. In one aspect, the performance measurement data is only collected when the relevant measurement reaches certain predetermined thresholds. In another aspect, the notification may include time stamp data so that the exact time for the relevant measurement may be noted and archived for logging or analysis.

At 820, the residential gateway creates alert data to pass to an in-range mobile device for transmission to the network central monitoring authority. The alert data can take on any format of alphanumeric characters however, in a preferred aspect, the length of the data may be limited to the maximum limit of SMS messages imposed by the service provider (typically 160 letters, numbers or symbols in the Latin alphabet). In another aspect, the alert data contains identifiable traceable data which uniquely identifies the residential gateway (such as the MAC address of the gateway). In yet another aspect, the alert data includes geographical location information associated with the residential gateway. For instance, the associated femto cell 120 has a LAC (location area code) and RAC (routing area code) that is different from the macro network. These LAC and RAC are used to identify subscriber station location for a variety of reasons, most notably to direct incoming voice and data traffic to appropriate paging transmitters, and emergency calls as well. In yet another aspect, the location information is encoded within the alert data so that location information may not easily be deciphered.

At 830, the femto cell locates a mobile device in range of the femto cell. The femto cell generally keeps a list of associated (e.g., registered) mobile devices. Additionally, the femto cell can determine if a particular mobile device is 'awake' (actively using wireless services) or in idle mode. At 840 and 850, the alert data is provided to the femto cell so that an in-range mobile device may be utilized to notify the central network monitoring authority of the loss of connectivity at the residential gateway.

In an aspect, the femto cell may locate a neighboring femto cell. The femto cell may transmit beacons at a relatively low power for a relatively long period of time to reduce interference at nearby access terminals that are being served by a macro access point. The alert data is provided to the nearby femto cell so that its own in-range mobile device or the associated macro access point may be utilized to notify the central network monitoring authority of the loss of connectivity at the residential gateway.

SMS (or MMS) messages may be exchanged between devices and other networks. Among other functions, the femto cell may include a messaging server for storing and forwarding outgoing messages, and receives and forwards incoming messages. In this case, the messaging server forwards the alert data to initiate a messaging dialogue with a service provider, saves a copy of the message in memory, and routes the message to the location center. In one aspect, the messaging server may use SMPP (Short Message Peer-to-Peer Protocol) to route the SMS message request to the central network monitoring authority. If SMPP is used to route the SMS request to the central network monitoring authority, the central network monitoring authority may be enhanced to accept this SMPP messaging (i.e., the SMS request by way of SMPP).

Figure 9:
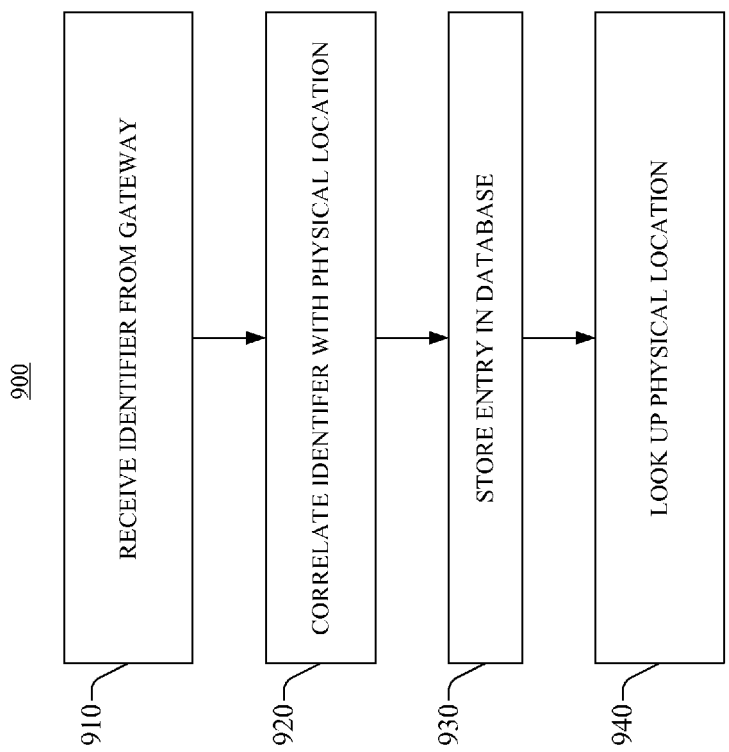
FIG. 9 is a flowchart illustrating the example steps according to exemplary embodiments.

FIG. 9 is a flowchart example of a method 900 for geographically locating a residential gateway so that service and maintenance of the gateway can be further facilitated. A gateway registers its geographical location with the service provider through an access point (AP) to the OSS. When a geographical position is needed for the residential gateway (e.g., a 911 call), messages are exchanged between the OSS and the residential gateway, where the OSS retrieves information from a database that is used to identify the geographic position of the mobile device. The database can store a variety of information related to the residential gateway such as: IP address, MAC address, a subscriber identifier (such as an International Mobile Subscriber Identity (IMSI)), etc. The geographical position is communicated back to the OSS, which can then forward the position information to a switch for processing such as for 911 calls.

It will be understood that a variety of system databases may also be accessed in the carrier network such as, e.g., an operation support subsystem (OSS) database, a business support system (BSS) database, and a central subscriber database that contains details of a carriers' subscribers (such as a home location register (HLR)), for billing, call logging, etc.

At 910, the OSS receives an identifier from the residential gateway. The identifier may be any form of suitable unique identifier that identifies the physical location of the subscriber identity. A variety of information may be uniquely related to the residential gateway such as: IP address, MAC address, a subscriber identifier (such as an International Mobile Subscriber Identity (IMSI)), etc.

At 920, the OSS correlates the identifier with a physical location. The unique identifier may be correlated to any of a variety of system databases which may be accessible to the OSS. Such databases can be an operation support subsystem (OSS) database, a business support system (BSS) database, or a central subscriber database that contains details of a carriers' subscribers (such as a home location register (HLR)), for billing, call logging, etc. It will be understood that, for example, a billing database entry may not necessarily be correlated to the physical location of the residential gateway since the billed-to entity may be a corporate head office, multiple home dwellers, etc.

At 930, the correlated physical location of the gateway and the unique identifier are stored in a separate database. Such storage in unison facilitates easy look-up of the physical location of the gateway when an alert data with unique identifier is received at the OSS. The alert data includes geographical location information associated with the residential gateway. For instance, the associated femto cell 120 has a LAC (location area code) and RAC (routing area code) that is different from the macro network. These LAC and RAC are used to identify subscriber station location for a variety of reasons, most notably to direct incoming voice and data traffic to appropriate paging transmitters, and emergency calls as well. In yet another aspect, the location information is encoded within the alert data so that location information may not easily be deciphered. At 940, a look-up is facilitated when the physical location is received at the OSS. In an aspect, each unique identifier is associated with a history or log of alerts so that routine maintenance or replacement/removal of the customer premises equipment can be facilitated.

Figure 10:
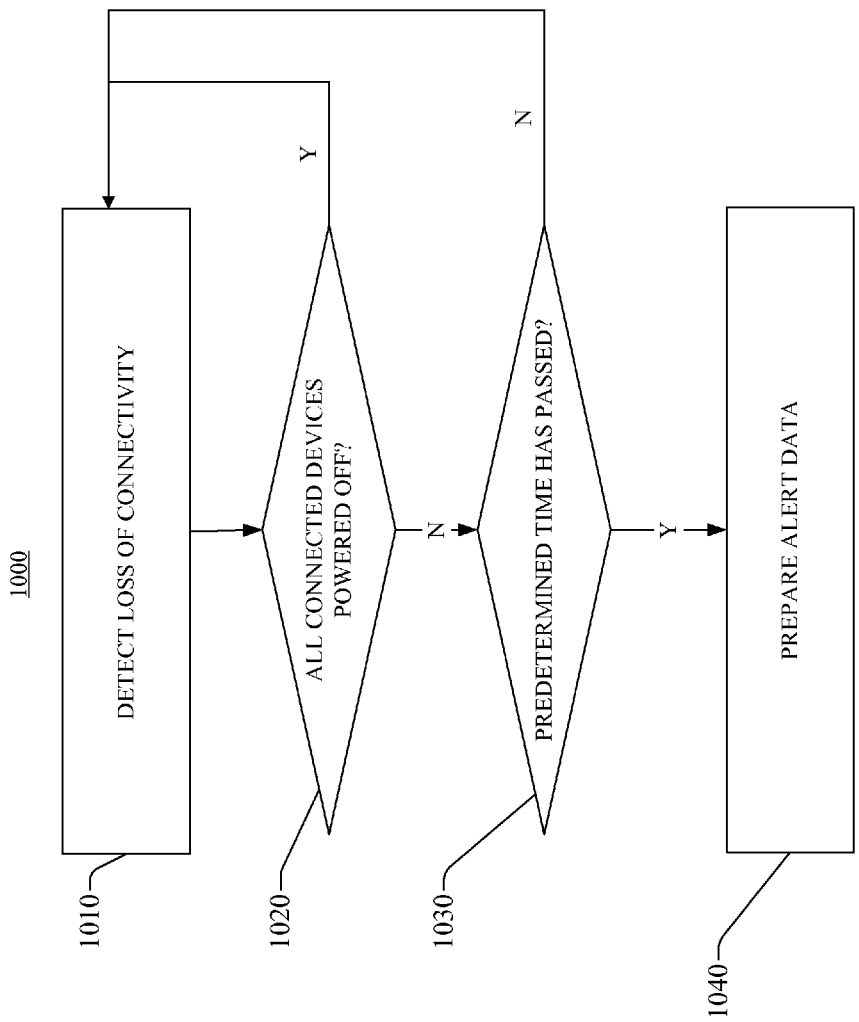
FIG. 10 is a flowchart illustrating the example steps according to exemplary embodiments.

FIG. 10 is a flowchart example of a rules-based method 1000 for determining when alert data is prepared for transmission to the OSS. As stated infra, the residential gateway includes an intelligent component which monitors all or substantially all network performance related incidents at a particular residential gateway. The intelligent component performs a rules-based analysis so that network outages or intermittent slowdowns can be monitored.

At 1010, the intelligent component detects a loss of broadband connectivity at the residential gateway. The residential gateway includes a heartbeat monitor or a specialized sensor for monitoring the broadband connection. At 1020, the residential gateway determines if all of the connected devices are powered off. It will be noted that there should be consideration for intermittent losses of connectivity when there are periods with lack of packet transmissions and packet receptions. Additionally, there may be perceived a intermittent loss of connectivity when most or all of the connected devices for a residential gateway have been powered off.

At 1030, the residential gateway performs a rules-based analysis to determine if the loss of connectivity has occurred. In one aspect, the residential gateway may wait a predetermined period of time after initial indications from the monitor or sensor before determining that the loss of connectivity has occurred. At 1040, the residential gateway prepares alert data for transmission by in-range mobile devices.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle layers, such as a management layer, can be provided to communicatively couple to such sub-components in order to provide integrated functionality. Any components described herein may also interact with one or more other components not specifically described herein but generally known by those of skill in the art.

In view of the exemplary systems described supra, methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks are required to implement the methodologies described hereinafter.

It should be appreciated that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

What has been described above includes examples of the various embodiments. It is, of course, not possible to describe every conceivable combination of components or methodologies for purposes of describing the various embodiments, but one of ordinary skill in the art may recognize that many further combinations and permutations of the subject embodiments are possible. Accordingly, the various embodiments are intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various embodiments include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method, comprising:
  in response to performance parameter data associated with a transmission link that couples a residential gateway device to a network device of a wide area network being determined to fail to satisfy a defined performance criterion, determining, by the residential gateway device comprising a processor, notification data indicative of a network performance incident;
  determining, by the residential gateway device, a first femto access point device within a specified distance from a second femto access point device that is coupled to the residential gateway device; and directing, by the residential gateway device, the notification data to the first femto access point device to facilitate a transmission of the notification data to a network server via a mobile device coupled to the first femto access point device, wherein the transmission of the notification data to the network server facilitates determining, based on the notification data, a corrective action associated with the network performance incident that rectifies failure of the performance parameter data to satisfy the defined performance criterion.

2. The method of claim 1, wherein the facilitating comprises facilitating the transmission from the mobile device to the network server via a text message.

3. The method of claim 1, wherein the facilitating comprises facilitating the transmission from the mobile device to the network server via a multimedia message.

4. The method of claim 1, wherein the determining the notification data comprises determining location data indicative of a location of the residential gateway device.

5. The method of claim 1, further comprising:
determining, by the residential gateway device, the performance parameter data comprising determining latency data associated with a communication transmitted via the transmission link.

6. The method of claim 1, wherein the determining the notification data comprises determining time stamp data indicative of a time at which the network incident was determined to have occurred.

7. The method of claim 1, further comprising:
determining, by the residential gateway device, the performance parameter data comprising determining throughput data associated with the transmission link.

8. The method of claim 1, wherein the determining the notification data comprises determining location data indicative of a location of the second femto access point device based on location area code data associated with the second femto access point device.

9. The method of claim 1, further comprising:
determining, by the residential gateway device, the performance parameter data comprising determining bandwidth data associated with the transmission link.

10. The method of claim 1, wherein the defined performance criterion comprises a defined performance threshold and the method further comprises:
determining, by the residential gateway device, that the performance parameter data exceeds the performance threshold.

11. A method, comprising:
receiving, by a mobile device comprising a processor, notification data related to a network performance incident associated with a transmission link that couples a residential gateway device to a network device of a wide area network in response to determining that performance parameter data associated with the transmission link fails to satisfy a defined performance criterion, wherein the receiving comprises receiving the notification data from the residential gateway device via a first femto access point device that serves the mobile device and is located within a specified distance from a second femto access point device that is coupled to the residential gateway device; and
facilitating, by the mobile device, a transmission of the notification data to a network server via a macro network, wherein the transmission of the notification data to the network server facilitates determining, based on the notification data, a corrective action associated with the network performance incident to that rectifies failure of the performance parameter data to satisfy the defined performance criterion.

12. The method of claim 11, wherein the facilitating the transmission comprises facilitating the transmission via a text message.

13. The method of claim 11, wherein the facilitating the transmission comprises facilitating the transmission via a multimedia message.

14. The method of claim 11, wherein the receiving the notification data comprises receiving location data indicative of a location of the residential gateway device.

15. The method of claim 11, wherein the receiving the notification data comprises receiving identifier data indicative of an identifier of the residential gateway device.

16. The method of claim 11, wherein the receiving the notification data comprises receiving timing data indicative of time stamp associated with the network performance incident.

17. The method of claim 11, wherein the receiving the notification data comprises receiving notification data related to a network outage.

18. The method of claim 11, wherein the receiving the notification data comprises receiving location area code data associated with the second femto access point device that is indicative of a location of the second femto access point device.

19. The method of claim 11, wherein the receiving the notification data comprises receiving routing area code data associated with the second femto access point device that is indicative of a location of the second femto access point device.

20. The method of claim 11, wherein the defined performance criterion comprises a defined performance threshold and the receiving the notification data comprises receiving the notification data in response to the performance parameter data being determined to exceed the performance threshold.

21. A tangible computer-readable medium comprising computer-executable instructions that, in response to execution, cause a residential gateway device comprising a processor to perform operations, comprising:
in response to verifying that performance parameter data associated with a transmission link that couples a residential gateway device to a network device of a wide area network fails to satisfy a defined performance criterion, determining notification data indicative of a network performance incident;
facilitating a determination of a first femto access point device that is located within a specified distance from a second femto access point device, wherein the second access point device is coupled to the residential gateway device; and
subsequent to a selection of selecting a mobile device coupled to the first femto access point device, directing the notification data to a network server via the mobile device, wherein the notification data is utilized by the network server to facilitate a determination of a corrective action associated with the network performance incident that remedies failure of the performance parameter data to satisfy the defined performance criterion.

22. The tangible computer-readable medium of claim 21, wherein the notification data is forwarded to the network server via a text message.

23. The tangible computer-readable medium of claim 21, wherein the notification data is forwarded to the network server via a multimedia message.

24. The tangible computer-readable medium of claim 21, wherein the operations further comprise:

determining location data indicative of a location of the residential gateway device, wherein the location data is transmitted to the mobile device as part of the notification data.

25. The tangible computer-readable medium of claim 21, wherein the determining the location data is based on identifier data indicative of an identifier of the residential gateway device.

26. The tangible computer-readable medium of claim 21, wherein the operations further comprise:

determining timing data indicative of a time stamp assigned to the network performance incident, wherein the timing data is transmitted to the mobile device as part of the notification data.

27. The tangible computer-readable medium of claim 21, wherein the defined performance criterion comprises information indicative of a defined performance threshold.

28. The tangible computer-readable medium of claim 21, wherein the operations further comprise:

determining, based on location area code data related to the second femto access point device, location data indicative of a location of the second femto access point device, wherein the location data is transmitted to the mobile device as part of the notification data.

29. The tangible computer-readable medium of claim 21, wherein the determining the performance parameter data comprises determining bandwidth data associated the transmission.

30. A residential gateway device, comprising:

a memory to store instructions; and a processor, coupled to the memory, that facilitates execution of the instructions to perform operations, comprising:

in response to a determination that performance parameter data associated with a transmission link that couples the residential gateway device to a network device of a wide area network fails to satisfy a defined performance criterion, determining notification data indicative of a network performance incident, facilitating a determination of a first femto access point device that is located within a specified distance from a second femto access point device, wherein the second femto access point device is coupled to the residential gateway device, and facilitating a transmission of the notification data to the first femto access point device, wherein the notification data is directed from the first femto access point device to a network server via a mobile device coupled to the first femto access point device to facilitate implementation of a corrective action associated with the network performance incident and wherein the corrective action is determined to ensure that the performance parameter data satisfies the defined performance criterion.

31. The residential gateway device of claim 30, wherein the notification data is formatted as a textual message.

32. The residential gateway device of claim 30, wherein the notification data is formatted as a multimedia message.

33. The residential gateway device of claim 30, wherein the notification data comprises location data associated with a location of the residential gateway device.

34. The residential gateway device of claim 30, wherein the notification data comprises identifier data indicative of an identifier of the residential gateway device.

35. The residential gateway device of claim 30, wherein the notification data comprises timing data indicative of a time stamp assigned to the network performance incident.

36. The residential gateway device of claim 30, wherein the performance parameter data comprises latency data associated with a communication transmitted via the transmission link.

37. The residential gateway device of claim 30, wherein the defined performance criterion comprises information indicative of a defined performance threshold.

\* \* \* \* \*